United States Patent
Kasahara

(10) Patent No.: US 10,530,963 B2
(45) Date of Patent: Jan. 7, 2020

(54) SHADING CORRECTION DEVICE, ELECTRONIC APPARATUS, AND SHADING CORRECTION METHOD

(71) Applicant: Seiko Epson Corporation, Tokyo (JP)

(72) Inventor: Hideaki Kasahara, Matsumoto (JP)

(73) Assignee: Seiko Epson Corporation (JP)

( * ) Notice: Subject to any disclaimer, the term of this patent is extended or adjusted under 35 U.S.C. 154(b) by 80 days.

(21) Appl. No.: 15/823,764

(22) Filed: Nov. 28, 2017

(65) Prior Publication Data
US 2018/0152597 A1    May 31, 2018

(30) Foreign Application Priority Data
Nov. 29, 2016  (JP) ................................. 2016-231416

(51) Int. Cl.
*H04N 1/407*    (2006.01)
*H04N 1/60*    (2006.01)

(52) U.S. Cl.
CPC ......... *H04N 1/4076* (2013.01); *H04N 1/6019* (2013.01)

(58) Field of Classification Search
None
See application file for complete search history.

(56) References Cited

U.S. PATENT DOCUMENTS

| 5,032,903 A * | 7/1991 | Suzuki | H04N 1/00352 358/448 |
| 6,011,878 A * | 1/2000 | Ushida | G06T 3/40 358/3.1 |
| 6,323,965 B1 * | 11/2001 | Kodan | H04N 1/4076 345/629 |
| 2005/0013505 A1 * | 1/2005 | Nishimura | G06T 5/008 382/274 |
| 2016/0277622 A1 * | 9/2016 | Nagashima | H04N 1/02418 |

FOREIGN PATENT DOCUMENTS

JP    05-167845 A    7/1993

* cited by examiner

*Primary Examiner* — Zhiyu Lu
(74) *Attorney, Agent, or Firm* — Harness, Dickey & Pierce, P.L.C.

(57) ABSTRACT

A shading correction device includes a reference acquirer that acquires a reference pixel value W in a captured image of a color measurement reference object, a target pixel value acquirer that acquires a pixel value S in a captured image of a measurement target, a bit shift value acquirer that acquires a bit shift value k2 based on the reference pixel value W, a lookup table storing a variable $G_2$ ($=2^{k1}/W\!\gg\!k2$) corresponding to $W\!\gg\!k2$, and a calculator that reads the variable $G_2$ corresponding to the reference pixel value W and the bit shift value k2 from the lookup table and calculates a shading correction value $R_{dec}$ of each pixel in the captured image of the measurement target using Expression (5):

$$R_{dec} = (F \cdot G_2) \gg (k1 + k2) + B \qquad (5)$$

where $$F = S \cdot (A - B) + \{W \gg 1\},\ G_2 = \frac{2^{k1}}{W \gg k2},$$

and A, B and k1 are integer constants.

9 Claims, 7 Drawing Sheets

| INPUT W(W´−D) | OUTPUT k2 |
|---|---|
| 00···??b | 0 |
| 01···??b | 1 |
| 10···??b | 2 |
| 11···??b | 2 |

FIG. 6

| INPUT W−D>>k2 | OUTPUT $G_2$ |
|---|---|
| 00···??b | ··· |
| 001···??b | ··· |
| 0010···??b | ··· |
| 0011···??b | ··· |

FIG. 7

| INPUT W | OUTPUT G |
|---|---|
| 00···00b | ··· |
| 00···01b | ··· |
| . | . |
| . | . |
| . | . |
| 001··11b | ··· |
| 01···00b | ··· |
| 01···01b | ··· |
| . | . |
| . | . |
| . | . |
| 011··11b | ··· |
| 10···00b | ··· |
| 10···01b | ··· |
| . | . |
| . | . |
| . | . |
| 101··11b | ··· |
| 11···00b | ··· |
| 11···01b | ··· |
| . | . |
| . | . |
| . | . |
| 111··11b | ··· |

FIG. 8

SHADING CORRECTION DEVICE, ELECTRONIC APPARATUS, AND SHADING CORRECTION METHOD

BACKGROUND

1. Technical Field

The present invention relates to a shading correction device, an electronic apparatus, and a shading correction method.

2. Related Art

In the related art, a device is known, which performs shading correction for avoiding effects of illumination errors or the ambient light reduction due to the lenses in an object image using the object image in which an object is imaged and a reference image in which a reference object such as a white substrate is imaged (for example, refer to JP-A-5-167845).

In the device in the related art disclosed in JP-A-5-167845, when a pixel value of each pixel in the object image is S', a pixel value of each pixel in the reference image is W', and a dark value is D, a shading correction value is calculated by $-R_{float}=(S'-D)/(W'-D)$. In this case, in a case where the calculated value is used as image data, the shading correction value is calculated by a following integer operation. Here, "x>>y" is a shift operator indicating that x is shifted to the right as much as y bits, and A and B are integer constants.

$$R_{dec} = \frac{(S'-D)\cdot(A-B)+\{(W'-D)\gg 1\}}{W'-D} + B = \frac{F}{W'-D} + B \quad (1)$$

$$F = (S'-D)\cdot(A-B)+\{(W'-D)\gg 1\} \quad (2)$$

However, in the operation processing of the computer, division calculation processing requires a large processing cost, and the processing time for the division calculation processing as described above is long for the data with a large number of pixel values such as the images. Therefore, in the related art, shading correction calculation has been performed by replacing the Expression (1) and (2) with the following Expressions (3) and (4) in order to reduce the processing load.

$$R_{dec} = (F\cdot G) \gg k1 + B \quad (3)$$

$$G = \frac{2^{k1}}{W'-D} \quad (4)$$

(k1 is an integer constant)

In this case, by storing the variable G in the lookup table (LUT) in advance, the division calculation can be realized using a combination of multiplication calculation and the bit shift, and thus, the reduction of the processing load can be achieved.

However, in the operation using the above-described Expressions (3) and (4), there is a problem in that the data size of the LUT becomes large because the value of W'-D has various values.

SUMMARY

An advantage of some aspects of the invention is to provide a shading correction device, an electronic apparatus, and a shading correction method capable of reducing the data size of the LUT for the shading correction.

A shading correction device according to an aspect of the invention includes a reference acquirer that acquires a reference pixel value W which is a pixel value in a captured image of a color measurement reference object, a target pixel value acquirer that acquires a pixel value S in a captured image of a measurement target, a bit shift value acquirer that acquires a bit shift value k2 based on the reference pixel value W, a storage in which a lookup table storing a variable $G_2$ represented as $G_2=2^{k1}/W\gg k2$ corresponding to a value $W\gg k2$ in which the reference pixel value W is bit-shifted as much as the bit shift value k2 when an integer constant is assumed to be k1, is stored, and a calculator that reads the variable $G_2$ corresponding to the reference pixel value W acquired by the reference acquirer and the bit shift value k2 acquired by the bit shift value acquirer from the lookup table, and calculates a shading correction value $R_{dec}$ of each pixel in the captured image of the measurement target using Expression (5):

$$R_{dec} = (F\cdot G_2) \gg (k1+k2) + B \quad (5)$$

where $$F = S\cdot(A-B)+\{W\gg 1\}, \quad G_2 = \frac{2^{k1}}{W\gg k2},$$

and A, B and k1 are integer constants.

In the aspect of the invention, the reference pixel value W and the pixel value S may be the pixel value of each pixel of the captured image, or may be a value obtained by correcting the pixel value using a dark value. In other words, in a case of using the dark value D, in a case where the pixel value of the captured image of the color measurement reference object is W', the reference pixel value W becomes W=W'−D, and in a case where the pixel value of the captured image of the measurement target is S', the pixel value S becomes S=S'−D. In addition, the constant A is a value of the shading correction value in a case where the reflectance is 1. For example, in a case where the calculated shading correction value is directly used as the pixel data of the image data having 256 gradations, it can be assumed that A=255. The constant B is the value of the shading correction value when the reflectance is 0. The constant k1 is a bit shift value and can be set appropriately according to the accuracy of the shading correction value.

In the aspect of the invention, a look up table (LUT) in which $W\gg k2$ corresponding to W is stored in the storage. After the bit shift value k2 corresponding to reference pixel value W is acquired, a variable $G_2$ corresponding to the value ($W\gg k2$) obtained by bit-shifting the reference pixel value W as much as bit shift value k2 is acquired (read) from the storage (LUT). Thereafter, the shading correction value $R_{dec}$ (reflectance) is calculated based on Expression (5) using the variable $G_2$.

In the related art, as described above, k1 corresponding to W (or W'−D) is stored in the LUT. However, in this case, the data for the number of adoptable values of W (or W'−D) needs to be stored in the LUT, and thus, the number of data increases to an enormous number. In contrast, in the aspect, since the variable $G_2$ corresponding to $W\gg k2$ is acquired, the number of data stored in the LUT can be reduced compared to that in the related art.

In the shading correction device according to the aspect of the invention, it is preferable that the bit shift value acquirer acquire the bit shift value k2 based on the upper bits of the reference pixel value W.

In the aspect of the invention with this configuration, the bit shift value acquired by the bit shift value acquirer is acquired based on the upper bits of the reference pixel value W. For example, the values of upper 2 bits or upper 3 bits of the reference pixel value W can be exemplified. In a case of acquiring the bit shift value k2 based on upper 2 bits, k2=0 in a case where the upper 2 bits are "00", k2=1 in a case where the upper 2 bits are "01", and K2=2 in a case where the upper 2 bits are "10" and "11". As described above, by acquiring the bit shift value according to the upper 2 bits of the reference pixel value W, it is possible to easily acquire the bit shift value k2 based on the value of the reference pixel value W without performing a complicated calculation.

In the shading correction device according to the aspect of the invention, it is preferable that the storage further store a second lookup table in which the bit shift value k2 corresponding to the reference pixel value W is stored, and the bit shift value acquirer may acquire the bit shift value k2 corresponding to the reference pixel value W acquired by the reference acquirer, from the second lookup table.

In the aspect of the invention with this configuration, the bit shift value k2 corresponding to the reference pixel value W is read from the second lookup table (second LUT). In this case also, the second LUT is needed. However, the total number of data in the LUT and in the second LUT is sufficiently small compared to that in a case of storing the variable G corresponding to W in the LUT in the related art, and thus, the data size of the LUT used in calculating the shading correction value can sufficiently be reduced. In addition, by using the second LUT, it is possible to easily read the bit shift value k2.

An electronic apparatus according to an aspect of the invention includes the shading correction device described above and an imaging device that captures the captured image.

In the aspect of the invention, examples of the electronic apparatus include a printer, a camera, and the like. In the example of the printer, for example, an imaging device is provided in a part such as a print head facing media, and the media is imaged by the imaging device. In such a printer, it is possible to perform printing correction (for example, correction of the ejection amount of ink droplets) in the print head based on the shading correction result. In addition, in the example of the camera, the corrector can form the image based on the calculated shading correction value, can form the image in which the illumination errors of the light source or the ambient light reduction due to the lenses is corrected, and can display the image on the display.

A shading correction method according to an aspect of the invention is a method in which shading correction is performed by a computer. The computer includes a storage in which a lookup table storing a variable $G_2$ represented as $G_2=2^{k1}/W \gg k2$ corresponding to a value $W \gg k2$ in which the reference pixel value W which is the pixel value in the captured image of the color measurement reference object is bit-shifted as much as the predetermined bit shift value k2 when an integer constant is assumed to be k1, is stored, a reference acquirer, a target pixel value acquirer, a bit shift value acquirer, and a calculator. The shading correction method includes: acquiring the reference pixel value W using the reference acquirer, acquiring the pixel value S in the captured image of the measurement target using the target pixel value acquirer, acquiring the bit shift value k2 based on the reference pixel value W using the bit shift value acquirer, reading the variable $G_2$ corresponding to the reference pixel value W acquired by the reference acquirer and the bit shift value k2 acquired by the bit shift value acquirer from the lookup table using the calculator, and calculating a shading correction value $R_{dec}$ of each pixel in the captured image of the measurement target using Expression (5) above.

In the aspect of the invention, similarly to the above-described application example, since the variable $G_2$ corresponding to $W \gg k2$ is acquired, the number of data stored in the LUT can be reduced compared to that in the related art.

BRIEF DESCRIPTION OF THE DRAWINGS

The invention will be described with reference to the accompanying drawings, wherein like numbers reference like elements.

FIG. 6 is a diagram illustrating an example of a second LUT in the present embodiment.

FIG. 7 is a diagram illustrating an example of a first LUT in the present embodiment.

FIG. 8 is a diagram illustrating an LUT used for calculation of a shading correction in the related art.

DESCRIPTION OF EXEMPLARY EMBODIMENTS

Hereinafter, embodiments of the invention will be described based on the drawings. In the present embodiment, a printer 1 (an ink jet printer) will be described as an example of an electronic apparatus according to the invention.

Schematic Configuration of the Printer

Figure 1:
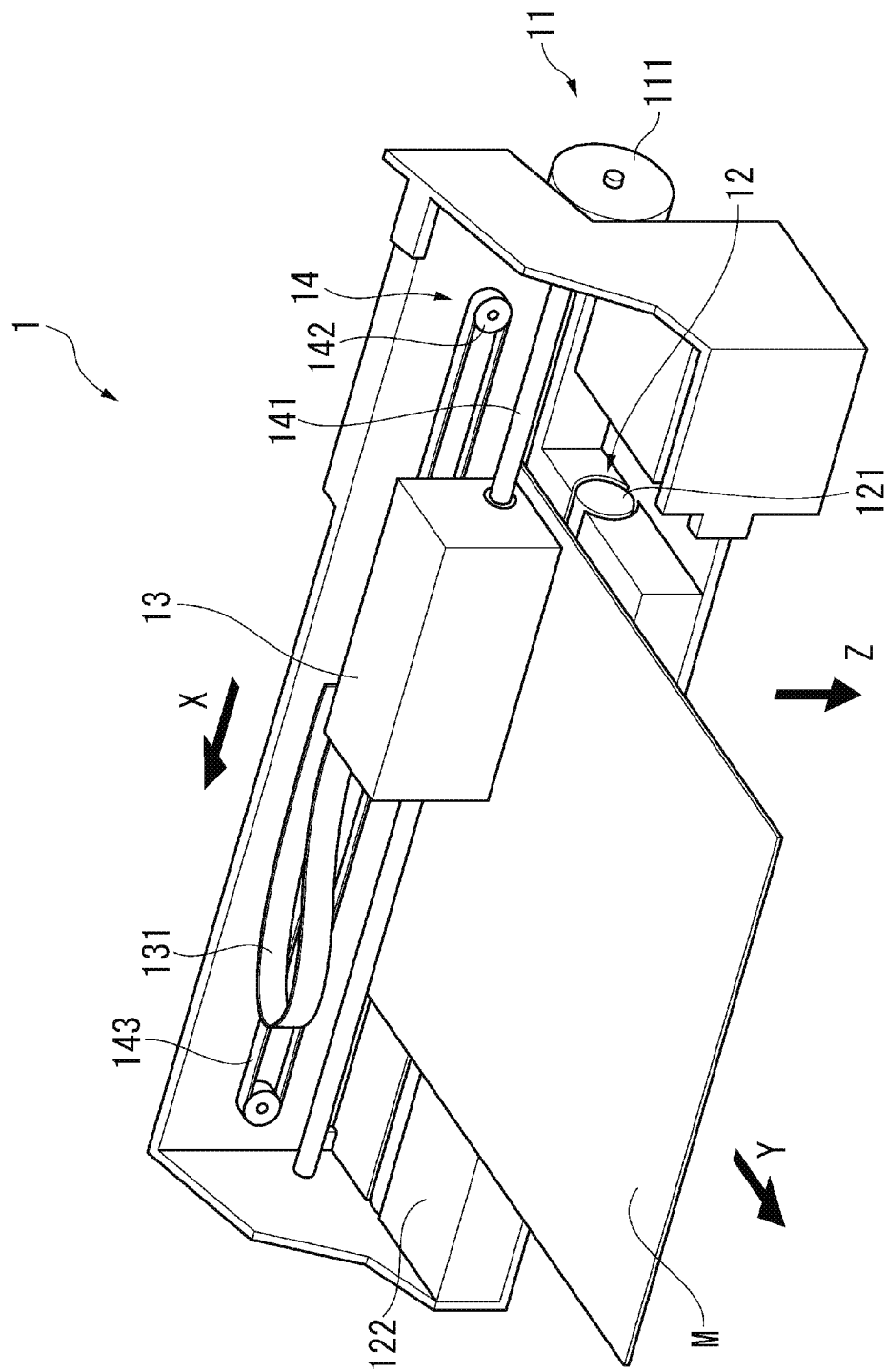
FIG. 1 is a diagram illustrating a configuration example of an external view of a printer in the present embodiment.
Figure 2:
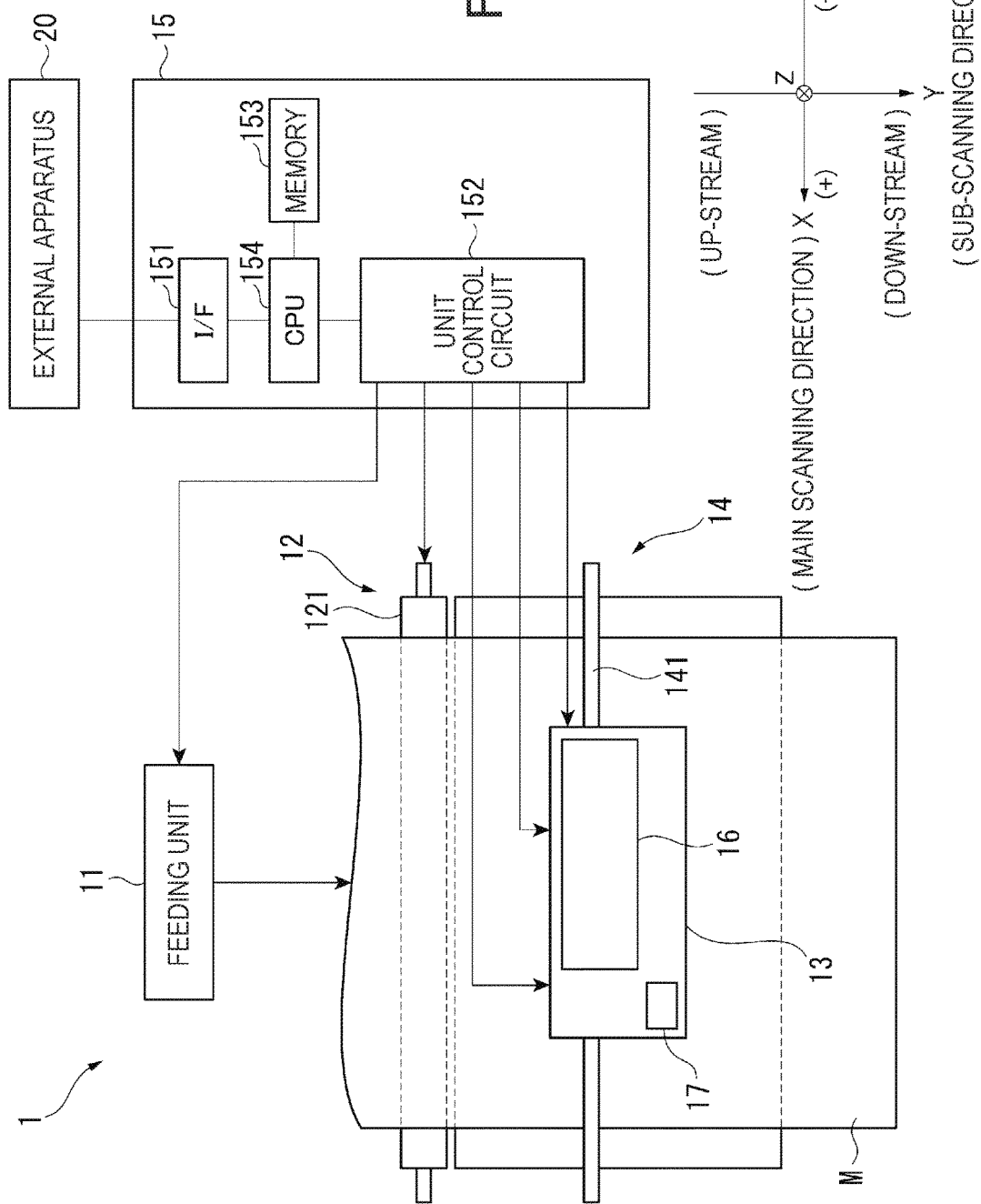
FIG. 2 is a block diagram illustrating a schematic configuration of the printer in the present embodiment.

FIG. 1 is a diagram illustrating a configuration example of an external view of the printer 1 in the present embodiment. FIG. 2 is a block diagram illustrating a schematic configuration of the printer 1 in the present embodiment.

As illustrated in FIG. 1, the printer 1 includes a feeding unit 11, a transport unit 12, a carriage 13, a carriage moving unit 14, and a control unit 15 (refer to FIG. 2). This printer 1 controls each unit 11, 12, and 14 and carriage 13 based on print data input from an external apparatus 20 such as a personal computer, and prints an image on media M. In addition, the printer 1 in the present embodiment forms a test pattern (measurement target) at a predetermined position on the media M based on an original image data set in advance, acquires a captured image of the test pattern and performs image processing (shading correction processing), and in a case where the printed image is not correct, then, performs correction processing.

Hereinafter, each configuration of the printer 1 will be described in detail.

The feeding unit 11 is a unit that feeds the media M which is an image forming target (in the present embodiment, a sheet is exemplified) to an image forming position. The feeding unit 11 includes, for example, a roll body 111 (refer to FIG. 1) on which the media M is wound, a roll drive motor (not illustrated), and a roll drive wheel line (not illustrated). Then, the roll drive motor is driven in rotation based on a command from the control unit 15, and the rotation force of the roll drive motor is transferred to the roll body 111 via the roll drive wheel line. As a result, the roll body 111 rotates, and the sheet wound on the roll body 111 is fed to the down-stream side (+Y direction) in the Y direction (sub scanning direction).

In the present embodiment, an example of feeding the sheet wound on a roll body 111 is described, but not limited thereto. For example, the media M may be supplied by any feeding method such as feeding the media M such as sheets loaded on a tray or the like one by one using a roller or the like.

The transport unit 12 transports the media M fed from the feeding unit 11 along the Y direction. The transport unit 12 is configured to include a transport roller 121, a driven roller (not illustrated) disposed across the transport roller 121 and the media M and is driven following the transport roller 121, and a platen 122.

When the driving force from the transport motor (not illustrated) is transferred and the transport motor is driven by the control of the control unit 15, the transport roller 121 is driven in rotation by the rotation force and transports the media M along the Y direction in a state of pinching the media M between the driven roller and the transport roller 121. In addition, in the down-stream side (+Y side) of the transport roller 121 in the Y direction, the platen 122 facing the carriage 13 is provided.

A print unit 16 that prints an image on the media M and an imaging unit 17 (an imaging device) that performs processing for imaging a predetermined measurement position (a measurement area) on the media M, are mounted on the carriage 13. The carriage 13 may be configured to be provided with a spectrometer separately.

The carriage 13 is provided so as to be capable of moving along the main scanning direction (X direction) intersecting the Y direction by the carriage moving unit 14.

In addition, the carriage 13 is connected to the control unit 15 by a flexible circuit 131 and performs print processing (image forming processing on the media M) using the print unit 16 and imaging processing using the imaging unit 17 based on commands from the control unit 15.

The detailed configuration of carriage 13 will be described later.

The carriage moving unit 14 configures a movement mechanism for moving the carriage 13 and reciprocally moves the carriage 13 along the X direction based on the command from the control unit 15.

The carriage moving unit 14 is configured to include, for example, a carriage guide axis 141, a carriage motor 142, and a timing belt 143.

The carriage guide axis 141 is disposed along the X direction and both ends thereof are fixed to a housing of the printer 1, for example. The carriage motor 142 drives the timing belt 143. The timing belt 143 is supported substantially parallel to the carriage guide axis 141, and a part of the carriage 13 is fixed thereto. When the carriage motor 142 is driven based on the command of the control unit 15, the timing belt 143 is moved forward and backward, and the carriage 13 fixed to the timing belt 143 is guided to the carriage guide axis 141 and moves reciprocally.

The configuration of the print unit 16 provided in the carriage 13, and the imaging unit 17 will be described.

Configuration of the Print Unit

The print unit 16 is an image forming unit and forms an image on media M (at a position facing the media M) by ejecting an individual ink droplet (liquid) onto the media M.

Ink cartridges (not illustrated) that correspond to the multiple colors of ink are removably mounted on the print unit 16, and the ink is supplied from each of the ink cartridges to the ink tank (not illustrated) via a tube (not illustrated). In addition, nozzles (not illustrated) that eject the ink droplets are provided in correspondence to the each color on the lower surface of the print unit 16 (the position facing the media M). In these nozzles, for example, piezo-elements are arranged, and by driving the piezo-elements, the ink droplets supplied from the ink tank are ejected and landed on the media M, and then, a dot is formed.

Configuration of the Imaging Unit

Figure 3:
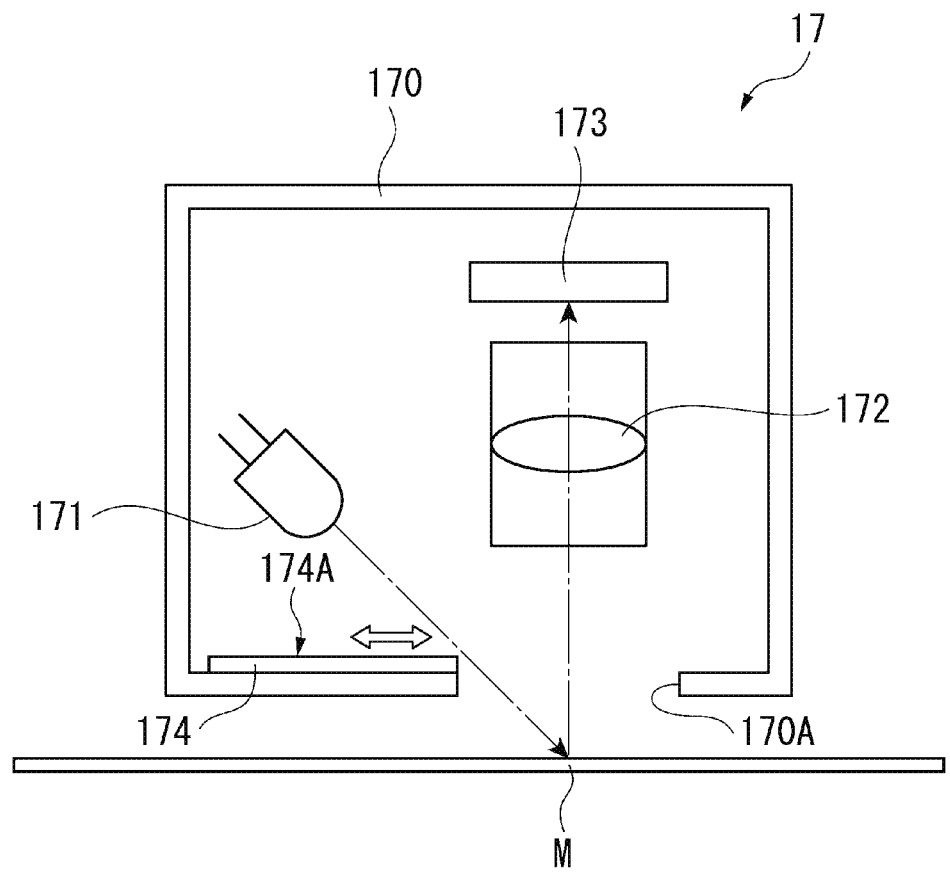
FIG. 3 is a diagram illustrating a schematic configuration of an imaging unit in the present embodiment.

FIG. 3 is a diagram illustrating a schematic configuration of the imaging unit 17.

The imaging unit 17 is configured to include a housing 170, a light source 171, an imaging lens 172, an image sensor element 173, and a shutter 174. The imaging unit 17 is disposed, for example, on the +X side and the +Y side of the print unit 16 on the carriage 13. Various image sensors such as CCD and CMOS can be used as the image sensor element provided in the imaging unit 17.

A window 170A is provided in a part of the housing 170, and by turning on the light source 171, the media M is irradiated by the illumination light from the window 170A, and then, the light reflected by the media M is incident on the image sensor element 173 from the window 170A via the imaging lens 172.

The image sensor element 173 outputs an image signal (image data of the captured image) based on the incident image light, and the image signal is input to the control unit 15 via an imaging circuit having, for example, an I-V converter, an amplifier, and an AD converter.

The shutter 170 is provided so as to open and close the window 170A. When the imaging unit 17 does not capture the image of the media M, the shutter 174 covers the window 170A to close, and when the imaging of the media M is performed, the shutter 174 is moved away from the window 170A. In addition, a white substrate 174A which is a color measurement reference object is provided on the shutter 174 on the surface facing the imaging lens 172. In this way, it is possible to capture the reference image by performing imaging processing in a state in which the window 170A is closed by the shutter 174 and the light source 171 is turned on. In addition, it is possible to perform measurement of a dark current (measurement of the dark value D) by performing imaging processing in a state in which the window 170A is closed by the shutter 174 and the light source 171 is turned off.

Configuration of the Control Unit

Next, the control unit 15 will be described.

The control unit 15 corresponds to the shading correction device according to the invention, and is configured to include an I/F 151 as described in FIG. 2, a unit control circuit 152, a memory 153 (a storage), and a central processing unit (CPU) 154.

The I/F 151 inputs the print data input from the external apparatus 20 to the CPU 154.

The unit control circuit 152 includes a control circuit that controls the feeding unit 11, the transport unit 12, the print unit 16, the light source 171, the imaging unit 17, and the carriage moving unit 14, and controls the operation of each unit based on the command signal from the CPU 154. The control circuit of each unit may be provided separately from the control unit 15 and may be connected to the control unit 15.

Various programs and various data items for controlling the operation of the printer 1 are stored in the memory 153.

The original image data to print a test pattern (for example, a shift adjustment pattern) on the media M, the ejection amount of each ink at the time of forming a predetermined color, and printing profile data in which an ink droplets ejection timing for landing the ink droplets on the predetermined position are stored, and the like are the examples of various data items. In addition, a first lookup table (a first LUT) and a second lookup table (a second LUT) for calculating the shading correction value (reflectance) are recorded as the various data items. Details of the data recorded in the lookup table will be described later.

Figure 4:
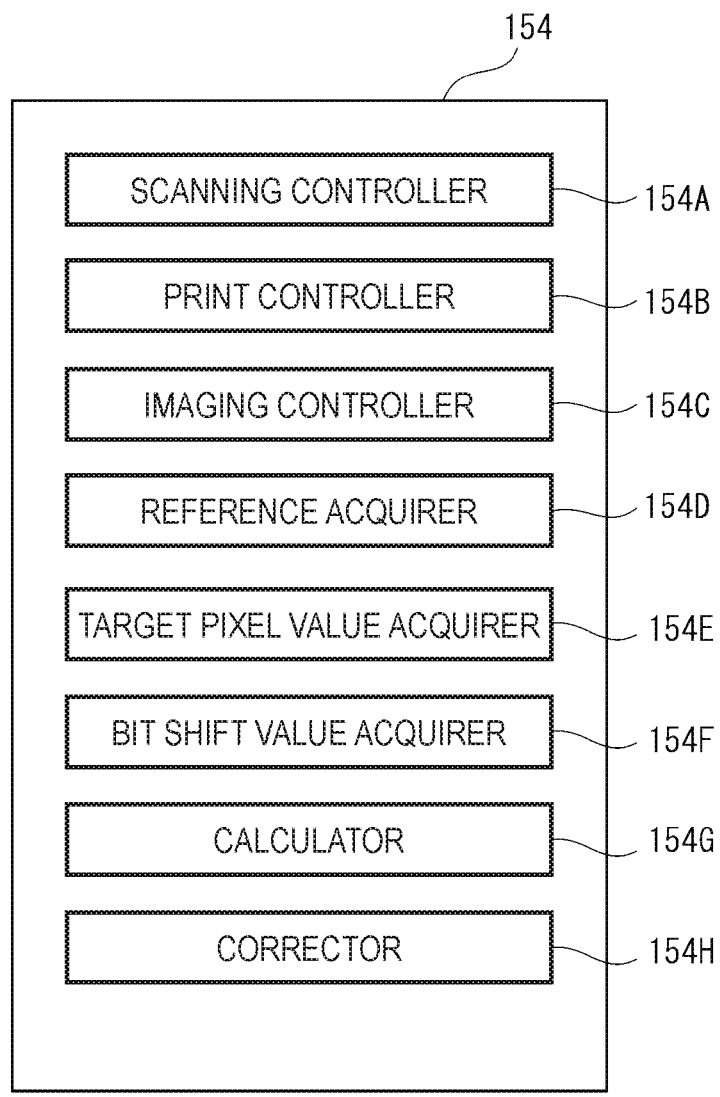
FIG. 4 is a block diagram illustrating a functional configuration of a CPU included in a control unit of the printer in the present embodiment.

FIG. 4 is a block diagram illustrating a functional configuration of the CPU 154 included in the control unit 15 of the printer 1.

As illustrated in FIG. 4, the CPU 154 functions as a scanning controller 154A, a print controller 154B, an imaging controller 154C, a reference acquirer 154D, a target pixel value acquirer 154E, a bit shift value acquirer 154F, a calculator 154G, and a corrector 154H by reading and executing various programs stored in the memory 153.

The scanning controller 154A outputs a command signal to the unit control circuit 152 to drive the feeding unit 11, the transport unit 12, and the carriage moving unit 14. In this way, the unit control circuit 152 drives the roll drive motor of the feeding unit 11 to feed the media M to the transport unit 12. In addition, the unit control circuit 152 drives the transport motor of the transport unit 12 to transport the predetermined area of the media M along the Y direction to a position facing the carriage 13 of the platen 122. In addition, the unit control circuit 152 drives the carriage motor 142 of the carriage moving unit 14 to move the carriage 13 along the X direction.

The print controller 154B outputs a command signal to the unit control circuit 152 to control the print unit 16 based on the print data input from, for example, the external apparatus 20. When the command signal is output from the print controller 154B to the unit control circuit 152, the unit control circuit 152 outputs a print control signal to the print unit 16 to drive a piezo-elements provided in the nozzles, and then, the ink is ejected to the media M. When performing the printing, the carriage 13 is moved along the X direction, and a dot forming operation for ejecting the ink from the print unit 16 during the movement and forming the dot, and a transport operation for transporting the media M to the Y direction, are alternately repeated, and then, an image formed with a plurality of dots is printed on the media M. At this time, the print controller 154B controls the ejection amount and the ejection timing of the ink droplets based on the print profile data, and causes the ink droplets to land at the target position.

The imaging controller 154C performs the imaging processing. Specifically, the imaging controller 154C controls the imaging unit 17 to drive the image sensor element 173, and then, acquires the image signal (captured image) input from the image sensor element 173.

When a color measurement reference object (for example, the white substrate 174A, or the like) is imaged by the imaging controller 154C, the reference acquirer 154D acquires the pixel value of each pixel of the captured image (reference image) as a reference pixel value W. In a case where the dark value D is measured in advance, the reference pixel value W is calculated as W=W'−D by subtracting the dark value D from the pixel value W' of each pixel of the reference image. In the imaging unit 17, the dark value is measured by turning off the light source 171, performing imaging processing in a dark state in which no light is incident on the image sensor element 173, and obtaining the pixel value of each pixel of the captured image as the dark value D of the pixel.

When the media M (for example, the test pattern on the media M) is imaged by the imaging controller 154C, the target pixel value acquirer 154E acquires the pixel value of each pixel of the captured image (measurement image) as the target pixel value S. In a case where the dark value D is measured in advance, the target pixel value S is calculated as S=S'−D by subtracting the dark value D from the pixel value of each pixel S' of the measurement image.

The bit shift value acquirer 154F acquires the bit shift value k2 corresponding to the reference pixel value W from the second LUT stored in the memory 153.

The calculator 154G calculates the shading correction value $R_{dec}$ (reflectance) based on the reference pixel value W, the target pixel value S, and the bit shift value k2 and the integer constants A, B, and k1 stored in advance in the memory 153.

The detailed processing by the bit shift value acquirer 154F and the calculator 154G will be described later.

The corrector 154H generates a correction image by converting the target image using the shading correction value $R_{dec}$ calculated by calculator 154G, and performs the correction processing based on each pixel value (the shading correction value $R_{dec}$) of the correction image. As the correction processing, for example, the test pattern of the correction image is compared with the original image data of the test pattern, processing for determining whether or not the ink ejection amount is excessive, ejection position (ejection timing) determination processing is performed, and then, the correction amount for correct the ejection amount and the ejection position of the ink is calculated.

As a result, the print controller 154B can control the print processing (ejection speed and the ejection timing of the ink droplets) by the print unit 16 based on the correction amount calculated by the corrector 154H.

Correction Method

Next, the correction processing including a shading correction method in the printer 1 in the present embodiment will be described.

Figure 5:
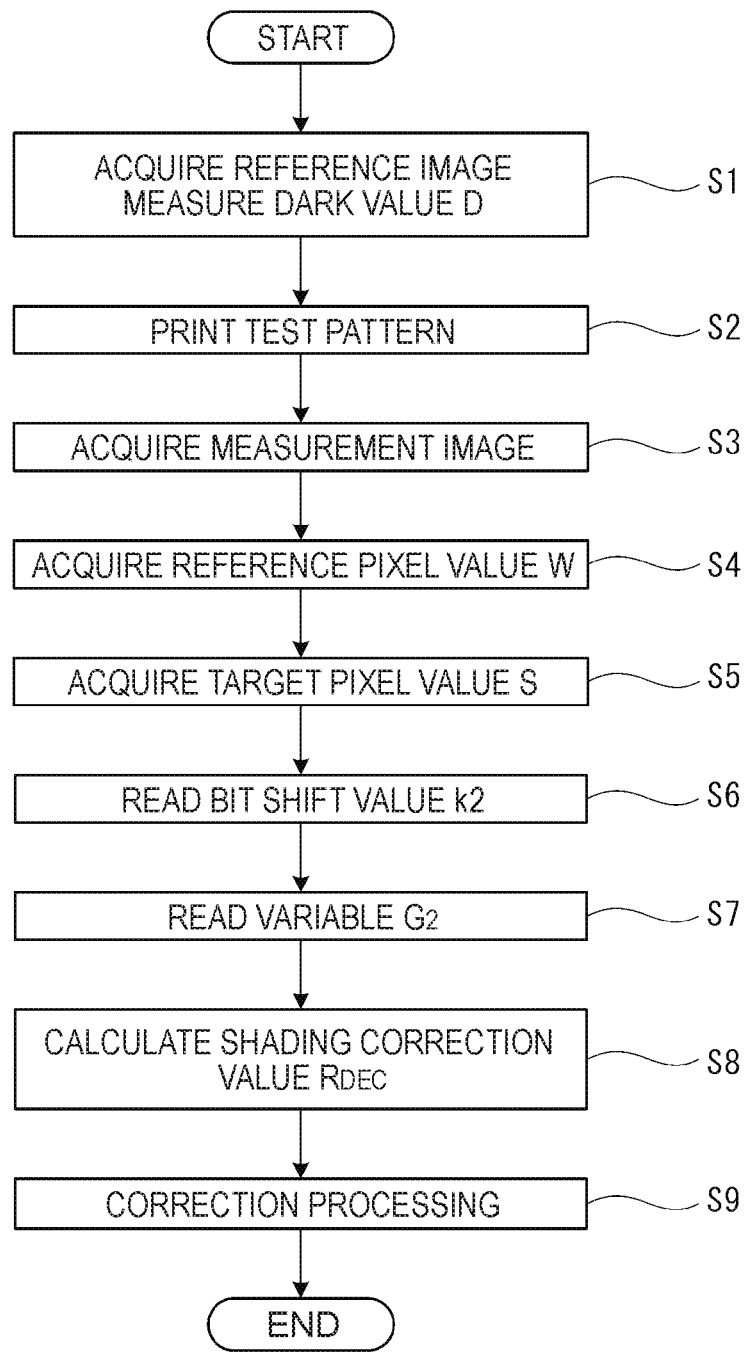
FIG. 5 is a flowchart illustrating a correction method in the present embodiment.

FIG. 5 is a flowchart illustrating the correction method in the present embodiment.

In the present embodiment, the printer 1 performs correction processing when, for example, a user's operation or a command to perform the correction processing in the print unit 16 is input from the external apparatus 20, or when a preset time has come.

First, the imaging controller 154C controls the imaging unit 17 to close the window 170A using the shutter 174, performs the processing for imaging the white substrate 174A, and then, acquires the reference image and the dark value D (STEP S1). Specifically, the imaging processing is performed in a state in which the light source 171 is turned off and the dark value D acquired (measured), and next, the imaging processing is performed in a state in which the light source 171 is turned on, and the reference image is captured (acquired).

In the present embodiment, the white substrate 174A provided in the shutter 174 are exemplified as the color measurement reference object, but the white substrate 174A is not limited thereto. For example, the white substrate provided on the platen 122 in advance may be used as the color measurement reference object, or an area of the white sheet where the image is not printed may be used as the color measurement reference object.

Next, the scanning controller 154A and the print controller 154B control the feeding unit 11, the transport unit 12, the carriage moving unit 14, and the print unit 16 to print a test pattern on the media M (STEP S2). Here, an example of performing STEP S2 after performing STEP S1 is described, but STEP S1 may be performed after STEP S2.

After STEP S2, the imaging controller 154C controls the imaging unit 17 to acquire a captured image (measurement image) for the test pattern (STEP S3).

Thereafter, the reference acquirer 154D acquires (calculates) the reference pixel value W (=W'-D) by subtracting the dark value D from each pixel value W' of the reference image acquired in STEP S1 (STEP S4).

The target pixel value acquirer 154E acquires (calculates) the target pixel value S (=S'-D) by subtracting the dark value D from each pixel value S' of the measurement image (STEP S5).

Next, the bit shift value acquirer 154F reads the bit shift value k2 corresponding to the reference pixel value W acquired in STEP S4 from the second LUT stored in the memory 153 (STEP S6).

FIG. 6 is a diagram illustrating an example of the second LUT. As illustrated in FIG. 6, upper 2 bits of the reference pixel value W and the value of the bit shift value k2 corresponding thereto are recorded in the second LUT. In the present embodiment, since it is sufficient to record the values of the bit shift value k2 corresponding to the values of the upper 2 bits, four data items corresponds to "00", "01", "10", and "11" may be sufficient to be recorded as the number of data of the second LUT.

Next, the calculator 154G reads the variable $G_2$ corresponding to the value (W>>k2) obtained by bit-shifting the reference pixel value W acquired in STEP S4 as much as the bit shift value k2 acquired in STEP S6 from the first LUT stored in the memory 153 (STEP S7).

FIG. 7 is a diagram illustrating an example of the first LUT used in the present embodiment.

As shown in FIG. 7, in the present embodiment, a variable $G_2$ corresponding to the value (W>>k2) obtained by bit-shifting the reference pixel value W as much as k2 is recorded in the first LUT. The variable $G_2$ is a variable indicated by $G_2 = 2^{k1}/(W>>k2)$ as indicated in the following Expression (5).

Thereafter, the calculator 154G calculates the shading correction value $R_{dec}$ based on the following Expression (5) (STEP S8). The following Expression (5) is the same as the above-described Expression (5):

$$R_{dec} = (F \cdot G_2) \gg (k1 + k2) + B \quad (5)$$

where $$F = S \cdot (A - B) + \{W \gg 1\}, \quad G_2 = \frac{2^{k1}}{W \gg k2},$$

and A, B and k1 are integer constants.

In Expression (5), the constant A is a value indicating the reference value of the shading correction value, and is a value set as a shading correction value when the reflectance is 1. For example, in a case where the shading correction value is directly used as the image data having 256 gradations, it can be assumed that A=255.

In addition, the constant B is the value of the shading correction value when the reflectance is 0.

The constant k1 is a bit shift value and can be set appropriately according to the accuracy of the shading correction value calculated by the calculator 154G. By decreasing the value of k1, it is possible to obtain a calculation result with high accuracy.

These constants A, B, and k1 are stored in the memory 153 in advance, and the calculator 154G calculates the shading correction value $R_{dec}$ based on these constants A, B, and k1 and the reference pixel value W, the target pixel value S, bit shift value k2 and the variable $G_2$ acquired in STEPs S4 to S7.

Thereafter, the corrector 154H performs the correction processing based on the calculated shading correction value $R_{dec}$, calculates the correction amount for correcting the ink ejection amount and ink ejection position (ejection timing) in the print unit 16, and then, performs the correction processing (STEP S9).

Data Size of the LUT

Next, the data sizes of the LUTs used for calculating the shading correction value in the related art and the first LUT in the present embodiment will be described.

As described above, in calculating the shading correction value in the related art, the variable G corresponding to the reference pixel value W (=W'-D) is read from the LUT in which the value of the variable G is stored, and the shading correction value $R_{dec}$ is calculated by the multiplication processing and the bit shift processing using the above-described Expressions (3) and (4).

FIG. 8 is a diagram illustrating an example of the LUT in the related art.

In this case, as illustrated in FIG. 8, since the variable G corresponding to the reference pixel value W is stored in the LUT, the number of data of the LUT is required as much as the adoptable values of the reference pixel value W. For example, in a case where the reference pixel value W is 8-bit data, 256 pieces of data are required, and the data size of the LUT is increased.

In contrast, in the present embodiment, as shown in FIG. 7, in the data group corresponding to W–D>>k2, the upper 2 bits are "00". Therefore, in a case where the reference pixel value W is 8-bit data, the number of data included in the first LUT is 64. As described above, in the present embodiment, the number of data is ¼ of that of the LUT in the related art shown in FIG. 8, and the data size can be reduced.

In the present embodiment, the second LUT is separately used, but in the second LUT, as shown in FIG. 6, the number of data becomes 4 bit because it is enough to store the bit shift value k2 corresponding to the numerical values of upper 2 bits. Therefore, even if the numbers of data of the first LUT and the second LUT are summed, the number of data is smaller than that of the LUT in the related art illustrated in FIG. 8, and thus, it is possible to sufficiently reduce the data size.

Operation Effects of the Present Embodiment

The printer 1 in the present embodiment includes a reference acquirer 154D that acquires the reference pixel value W, a target pixel value acquirer 154E that acquires the target pixel value S, a bit shift value acquirer 154F that acquires the bit shift value k2 to the reference pixel value W, and calculator 154G that reads the variable $G_2$ corresponding to W>>k2 from the first LUT and calculates the shading correction value $R_{dec}$ according to the above-described Expression (5).

In this way, since the number of data of the first LUT can be reduced as much as an amount corresponding to the bit shift value k2 compared to the LUT in the related art, the first data size of the LUT can be reduced.

In addition, by reducing the first data size of the LUT, the capacity of the memory 153 in the printer 1 can also be reduced, and thus, it is possible to achieve the cost reduction of the devices.

In the embodiment, the bit shift value acquirer 154F acquires the bit shift value k2 based on the upper 2 bits of the reference pixel value W.

As described above, by acquiring the bit shift value k2 acquired by the bit shift value acquirer 154F based on the upper bits of the reference pixel value W, it is possible to easily acquire the bit shift value k2 without performing a complicated calculation.

In addition, even in a case of acquiring the bit shift value k2 based on the second LUT, it is sufficient that the number of data may be recorded as much as the pattern that can be adopted by the upper 2 bits as the second LUT. Therefore, it is possible to reduce the data size of the second LUT.

Modification Example

The invention is not limited to each of the embodiments described above, and modifications and improvements within the range of achieving the object of the invention, and structures obtained by appropriately combining each embodiment, or the like, are included in the invention.

For example, in the embodiment described above, the bit shift value acquirer 154F acquires the bit shift value k2 based on the upper 2 bits of the reference pixel value W. However, the bit shift value acquirer 154F may acquire the bit shift value k2 based on, for example, the upper 3 bits, or the like. In this case, the number of data recorded in the first LUT can be further reduced, and thus, it is possible to further reduce the data size.

In addition, in the embodiment described above, the bit shift value acquirer 154F reads the bit shift value k2 corresponding to the value of the upper 2 bits of the reference pixel value W from the second LUT, but is not limited thereto. For example, the bit shift value k2 may be determined by condition determination processing using an "if statement" or the like. Specifically, the bit shift value acquirer 154F determines whether or not the upper 2 bits are "00" referring to the upper 2 bits of the reference pixel value W, and in a case where the upper 2 bits of the reference pixel value W is "00", then, sets k2=0. In addition, in a case where the upper bits are not "00", the bit shift value acquirer 154F determines whether or not the upper 2 bits are "01", and in a case where the upper 2 bits are "01", then set k2=1. Furthermore, in a case where the upper 2 bits are not "01", the upper 2 bits are regarded as "10" or "11", then, the bit shift value acquirer 154F sets k2=2. In this condition determination processing, the complicated calculation processing is unnecessary, and thus, the processing load does not increase. Furthermore, since the second LUT can be made unnecessary, the memory capacity of the memory 153 can be further reduced, and thus, it is possible to achieve the cost reduction of the device.

In the description in each of the above embodiments, the imaging unit 17 is mounted on the carriage 13 of the printer 1, but is not limited thereto. For example, the imaging unit 17 is may be configured not to be mounted on the carriage, and may image a predetermined imaging range, or may be configured to be movable by another movement mechanism as a separate body from the carriage 13.

In the embodiment described above, a shading correction device is configured with the control unit 15 in the printer 1, but is not limited thereto. For example, software that causes the calculation circuit (CPU or the like) of an external apparatus to function as the reference acquirer 154D, the target pixel value acquirer 154E, the bit shift value acquirer 154F, and the calculator 154G, may be installed on the external apparatus such as a personal computer communicably connected to the printer 1. In this case, the external apparatus can be regarded as the shading correction device by the calculation circuit of the external apparatus reading the software from the storage and executing the software.

In addition, the first LUT and the second LUT are stored in the memory 153 of the printer 1, but the LUTs may be stored in a storage device provided in the external apparatus capable of communicating with the printer 1 (control unit 15). For example, the first LUT and the second LUT may be stored in a storage device of a server device capable of communicating via the Internet, and by transmitting the value of reference pixel value W or W>>k2 to the server device, and then, the bit shift value k2 and the variable $G_2$ may be received.

The printer 1 is described as an example of the electronic apparatus according to the invention, but the invention is not limited thereto. For example, the invention can be applied to a device such as a digital camera or a smart phone that captures an image. Particularly, the invention is effective for a portable device having only a storage device with a limited memory capacity.

Furthermore, the specific structure at the time of embodying the invention may be configured by appropriately combining each of the embodiments and the modification examples within the range of achieving the object of the invention, and also may be appropriately changed to another structure or the like.

The entire disclosure of Japanese Patent Application No. 2016-231416 filed on Nov. 29, 2016 is expressly incorporated by reference herein.

What is claimed is:

1. A shading correction device comprising:
   a light source configured to emit a light on one of a color measurement reference object and a measurement target;
   an image sensor configured to receive a reflected light from one of the color measurement reference object and the measurement target, the reflected light being obtained by reflecting the light at one of the color measurement reference object and the measurement target;
   a memory configured to store a program, a first lookup table, and a second lookup table; and
   a processor configured to execute the program so as to:
      acquire a reference pixel value W in a first captured image obtained by the image sensor, the first captured image corresponding to the reflected light from the color measurement reference object;
      acquire a pixel value S in a second captured image obtained by the image sensor, the second captured image corresponding to the reflected light from the measurement target;
      acquire a bit shift value k2 from the second lookup table by using the reference pixel value W, the second lookup table including a correlation between the reference pixel value W and the bit shift value k2, wherein the bit shift value k2 is an integer that is equal to or more than 1;

obtain a value Wk2 by bit-shifting the reference pixel value W to a right by the acquired bit shift value k2 when an integer constant is k1;

obtain a value of a variable $G_2$ from the first lookup table by using the obtained value Wk2, the first lookup table including a correlation between the value Wk2 and the value of the variable $G_2$ based on $G_2 = 2^{k1}/Wk2$; and calculate a shading correction value $R_{dec}$ of each pixel in the second captured image of the measurement target using expression:

$$R_{dec} = (F \cdot G_2) \gg (k1 + k2) + B$$

where $$F = S \cdot (A - B) + \{W \gg 1\}, \; G_2 = \frac{2^{k1}}{W \gg k2},$$

and A, B and k1 are integer constants.

2. The shading correction device according to claim 1, wherein the bit shift value k2 is acquired by using upper bits of the reference pixel value W.

3. The shading correction device according to claim 2, wherein the upper pits of the reference pixel value W are either upper two bits or upper three bits of the reference pixel value W.

4. A printer comprising:
the shading correction device according to claim 1; and
a printing mechanism configured to print on a medium,
wherein the processor is configured to control the printing mechanism in response to the calculated shading correction value $R_{dec}$.

5. A printer comprising:
the shading correction device according to claim 2; and
a printing mechanism configured to print on a medium,
wherein the processor is configured to control the printing mechanism in response to the calculated shading correction value $R_{dec}$.

6. A printer comprising:
the shading correction device according to claim 3; and
a printing mechanism configured to print on a medium,
wherein the processor is configured to control the printing mechanism in response to the calculated shading correction value $R_{dec}$.

7. A shading correction method for causing a processor to execute a program stored in a memory, the method comprising executing on the processor the steps of:

storing a first lookup table and a second lookup table in the memory;

emitting a light on one of a color measurement reference object and a measurement target;

receiving a reflected light from one of the color measurement reference object and the measurement target so as to capture an image thereof, the reflected light being obtained by reflecting the light at one of the color measurement reference object and the measurement target, the captured image including first and second captures images;

acquiring a reference pixel value W in the first captured image corresponding to the reflected light from the color measurement reference object;

acquiring the pixel value S in the second captured image corresponding to the reflected light from the measurement target;

acquiring a bit shift value k2 from the second lookup table by using the reference pixel value W, the second lookup table including a correlation between the reference pixel value W and the bit shift value k2, wherein the bit shift value k2 is an integer that is equal to or more than 1;

obtaining a value Wk2 by bit-shifting the reference pixel value W to a right by the acquired bit shift value k2 when an integer constant is k1;

obtaining a value of a variable $G_2$ from the first lookup table by using the obtained value Wk2, the first lookup table including a correlation between the value Wk2 and the value of the variable $G_2$ based on $G_2 = 2^{k1}/Wk2$; and calculating a shading correction value $R_{dec}$ of each pixel in the second captured image of the measurement target using expression:

$$R_{dec} = (F \cdot G_2) \gg (k1 + k2) + B$$

where $$F = S \cdot (A - B) + \{W \gg 1\}, \; G_2 = \frac{2^{k1}}{W \gg k2},$$

and A, B and k1 are integer constants.

8. The shading correction method according to claim 7, wherein the bit shift value k2 is acquired by using upper bits of the reference pixel value W.

9. The shading correction method according to claim 8, wherein the upper pits of the reference pixel value W are either upper two bits or upper three bits of the reference pixel value W.

* * * * *